May 22, 1956 L. LEITZ 2,746,348
OPTICAL VIEWING DEVICE WITH CONTRASTING COLOR PHASES
Filed Sept. 12, 1951
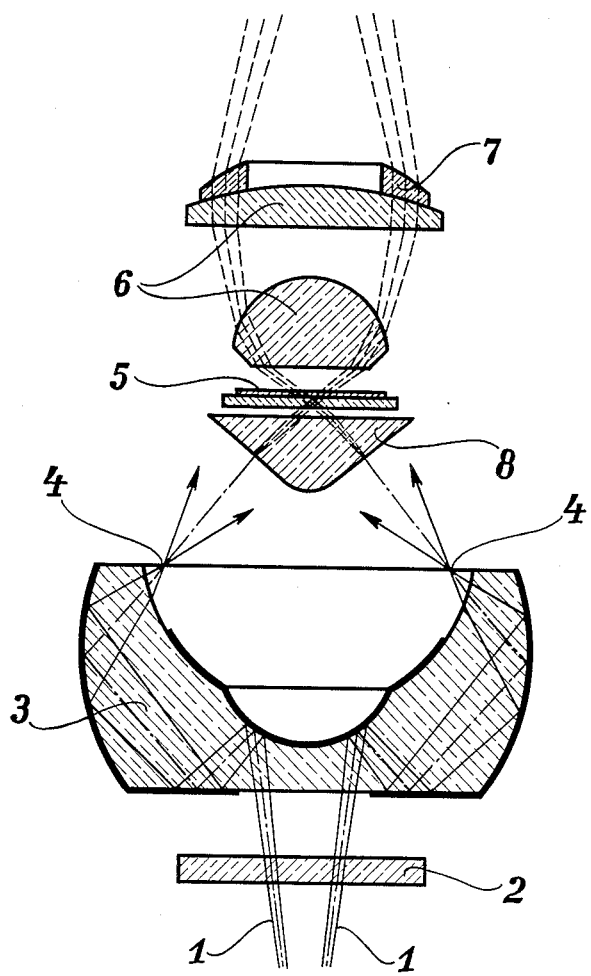

(# United States Patent Office)

2,746,348
Patented May 22, 1956

2,746,348

OPTICAL VIEWING DEVICE WITH CONTRASTING COLOR PHASES

Ludwig Leitz, Wetzlar, Germany, assignor to Ernst Leitz, G. m. b. H., a corporation of Germany Application September 12, 1951, Serial No. 246,236

Claims priority, application Germany September 15, 1950

2 Claims. (Cl. 88—39)

This invention relates to improvements in microscopes for observing the object in color phase contrast whereby such portions of the object which produce the various changes in the illuminating light appear in different colors.

Polarizing means have been proposed for this purpose. It has also been proposed to include in the system a phase plate consisting of two bodies of different dispersing powers with the result that different changes of phases were obtained for different wave lengths.

The object of the invention is to provide a microscope in which concentric colored rings of light are produced from a base of illuminating light upon a phase plate which is of radial tapering thickness. The phase plate may be of the type disclosed in the U. S. Patent 2,427,669, September 23, 1947, in Fig. 21 thereof. This patent is, however, not concerned with phase contrast in color.

The object of the present invention, namely, the provision of concentric colored rings of light upon a tapered phase plate may be solved in different embodiments of the invention. The preferred embodiment is disclosed in the accompanying drawing which shows a microscope system comprising a special condenser having an annular focus and forming the base of illumination. The white light therefrom is split by a dispersing body into colors of the spectrum so that different spectral colors may fall in ring formations upon selected zones of the tapered phase plate. The dispersing element is interposed between the ring formed base of illumination formed by said special ring condenser and the object. The light dispersing element for this purpose is characterized by three features. It must be a body of rotational symmetry in which the axis of rotation coincides with the optical axis of the system in order to preserve the ringshaped form of the image of the light source in the plane of the phase plate. The element must also be made of a material with spectral dispersion, and it must have at least one surface with an inclination toward the light rays passing through the element from the condenser to the phase plate in the back focal plane of the objective so that an essential dispersion in the meridional plane is produced. Said plane comprising the optical axis in its entire length in the direction of a radius. In other words, the plane of the accompanying drawing. Such element may be, for example, a glass cone or a chromatic lens. The white light which is emitted from the ring base is imaged by the dispersing element and the microscope objective upon the phase plate as a ring formed spectrum. The image of the latter may be narrowed or extended by a movement, up and down, respectively, of the base of illumination and thereby be positioned upon different thick portions of the tapered phase plate whereby different colors become different changes of phase whereby the colored phase contrast image may be varied and adapted for use with the particular object under examination.

The accompanying drawing is a diagram which illustrates one embodiment of the invention. In the diagram the illuminating bundle of light rays 1 passes through a color filter 2 which permits the passage of two or more spectral ranges of color. In the example illustrated it is assumed that the filter 2 is a three color filter. A condenser 3 condenses the light bundle into a narrow ring formed base of illumination 4. That is, the condenser 3 produces from the incoming white bundle of light rays 1 a ring formed, annular focus, base of illumination from which the light passes in cone formation to the dispersing body 8. This is a characteristic feature of this invention. The usual condenser produces a focal point of the light rays and this focal point lies in the object. The emerging rays pass through the dispersing glass element or cone 8. The object to be examined is shown at 5, and, as is known, a portion of the light is angularly diffracted by the object and comes into interference in the plane of the image with the rays of light which pass through the object. The objective 6 is provided in its exit pupil with an annular phase plate 7 which causes a change of phase in the light which passes through the object apart from the diffracted light which passes around the plate 7. The phase plate is characterized by having a tapered radial thickness.

The incoming white bundle of light rays 1 contains all spectral rays. The dispersing element 8 has the property of placing these spectral rays side by side so that they form a spectrum. However, if the light which enters the condenser contains only a few colors, i. e. mixed light, or if the incoming light is, for example, mercury rays, which include only some of the spectral lines, the dispersing element 8 also places such rays side by side, each color upon a separate place upon the radially tapered phase plate. Without the dispersing element 8 all the colors would fall upon the same spot upon the plate. Therefore, the element 8 and the color filter 2 are used together.

The size of the image of the base of illumination, which is produced upon the phase plate in the exit pupil of the objective, may be varied by adjusting the distance between the objective and the said base of illumination. The image may be placed upon certain portions of the plate which have such thickesses that the change of phases is adapted for the object under examination.

The illustrated embodiment of the invention may be modified by an arrangement in which the light which enters the condenser consists of two or more color components. The mixture of light which then emerges from the ring formed base of illumination produces upon the tapered phase plate separate colored rings which, by adjusting the vertical position of the condenser, may be positioned upon that portion of the phase plate which is best adapted for the character of the object under observation.

Another modification consists in an arrangement in which a colored contrast phase image is obtained by placing ring formed absorbing zones upon the tapered phase plate of such character that they permit, for example, only two or three ranges of spectral light to pass between them.

The problem of how to provide concentric colored rings upon the tapered phase plate may also be solved by an arrangement which includes a dark field condenser provided with a diaphragm having an annular light admitting opening which is imaged by the objective upon the plate, the condenser having ring formed zones. If, for example, the inner zone is colored red, the middle zone green and the outer zone blue, the phase plate may have its greatest thickness near the center of the plate and its smallest thickness at the edge. Such an arrangement has the advantage that the change in phases produced by the phase plate amounts to the same fraction of wave lengths for all three colors. The thickness of the plate may be so dimensioned that two or more colors are changed in phase in different fractions of their wave lengths. The plate may also have zones of different thicknesses or steepness spaced apart.

The vertical adjustment of the condenser may be obtained by any suitable means known in the art of microscopes. In the drawing the vertical adjustment is diagrammatically indicated by a vertical arrow with double arrow heads.

I claim:

1. A color phase contrast microscope for observing an object in color phase contrast comprising a microscope objective, a radially tapered phase plate therein above the same, a ring formed condenser below the objective, said condenser having a plurality of light reflecting surfaces forming an annular focus facing the objective and providing an illuminating base emitting different spectral rays toward the objective, a glass cone member positioned between said objective and said condenser with its apex facing the condenser, said glass cone member forming a light dispersing element for imaging the different spectral rays emitted by said condenser upon the said phase plate in the form of concentric colored rings and a light filter positioned below the condenser for the passage of at least two spectral ranges of color of the incoming light.

2. A color phase contrast microscope for observing an object in color phase contrast comprising a microscope objective, a radially tapered phase plate therein above the same, a ring formed condenser below the objective, said condenser having a plurality of light reflecting surfaces forming an annular focus facing the objective and providing an illuminating base emitting different spectral rays toward the objective, a glass cone member positioned between said objective and said condenser with its apex facing the condenser, said glass cone member forming a light dispersing element for imaging the different spectral rays emitted by said condenser upon the said phase plate in the form of concentric colored rings.

References Cited in the file of this patent

UNITED STATES PATENTS

| | | |
|---|---|---|
| 2,083,820 | Bissell | June 15, 1937 |
| 2,427,689 | Osterberg et al. | Sept. 23, 1947 |
| 2,519,428 | Birch-Field | Aug. 22, 1950 |
| 2,594,757 | Fischer | Aug. 29, 1952 |
| 2,616,334 | Zernike | Nov. 4, 1952 |
| 2,674,157 | Heine | Apr. 6, 1954 |
| 2,675,737 | Bennett | Apr. 20, 1954 |

FOREIGN PATENTS

| | | |
|---|---|---|
| 648,801 | Great Britain | Jan. 10, 1951 |